United States Patent
Wu et al.

(10) Patent No.: US 7,518,820 B1
(45) Date of Patent: *Apr. 14, 2009

(54) DETECTING FLY HEIGHT OF A HEAD OVER A STORAGE MEDIUM

(75) Inventors: Zining Wu, Los Altos, CA (US); Toai Doan, Santa Clara, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/082,423

(22) Filed: Apr. 11, 2008

Related U.S. Application Data

(63) Continuation of application No. 11/656,734, filed on Jan. 22, 2007, now Pat. No. 7,359,139, which is a continuation of application No. 10/671,030, filed on Sep. 24, 2003, now Pat. No. 7,199,961.

(60) Provisional application No. 60/457,660, filed on Mar. 25, 2003.

(51) Int. Cl.
*G11B 21/02* (2006.01)

(52) U.S. Cl. .......................................... 360/75; 360/31

(58) Field of Classification Search ........................ None
See application file for complete search history.

(56) References Cited

U.S. PATENT DOCUMENTS

| | | | |
|---|---|---|---|
| 4,777,544 A | 10/1988 | Brown et al. | |
| 5,377,058 A | 12/1994 | Good et al. | |
| 5,909,330 A | 6/1999 | Carlson et al. | |
| 6,094,318 A | 7/2000 | Kim | |
| 6,097,559 A | 8/2000 | Ottesen et al. | |
| 6,411,458 B1 | 6/2002 | Billings et al. | |
| 6,898,034 B2 | 5/2005 | Dakroub et al. | |
| 6,930,844 B2 | 8/2005 | Yeh et al. | |
| 2001/0050826 A1 | 12/2001 | Helsel et al. | |
| 2002/0001151 A1 | 1/2002 | Lake | |
| 2002/0062466 A1 | 5/2002 | Noguchi | |
| 2002/0071196 A1 | 6/2002 | Chapin et al. | |
| 2002/0176185 A1 | 11/2002 | Fayeulle et al. | |
| 2003/0067698 A1 | 4/2003 | Dakroub et al. | |
| 2003/0110344 A1 | 6/2003 | Szczepanek et al. | |

*Primary Examiner*—Jason C Olson

(57) ABSTRACT

A fly height control system comprises a measurement circuit that receives M pulses that are based on a predetermined pattern stored on a storage medium and that determines a first amplitude and a second amplitude for each of the M pulses, where M is an integer greater than one. The first amplitude is determined at a first time and the second amplitude is determined at a second time that is different than the first time. A calculation circuit determines a distance between a head and a storage medium based on a function of the first amplitudes for the M pulses and the second amplitudes for the M pulses. A head controller controls the head based on the distance determined by the calculation circuit.

16 Claims, 8 Drawing Sheets

DETECTING FLY HEIGHT OF A HEAD OVER A STORAGE MEDIUM

CROSS-REFERENCE TO RELATED APPLICATIONS

This application is a continuation application of U.S. patent application Ser. No. 11/656,734, filed Jan. 22, 2007, which is a continuation of U.S. patent application Ser. No. 10/671,030, filed on Sep. 24, 2003, which claims the benefit of U.S. Provisional Patent Application No. 60/457,660, filed Mar. 25, 2003. The disclosures of the above applications are incorporated herein by reference.

FIELD OF THE INVENTION

The present invention relates generally to transferring data to and from storage media for storing the data. More particularly, the present invention relates to detecting the fly height of a head over a storage medium.

BACKGROUND OF THE INVENTION

In storage media systems, it is important to maintain the fly height of the head within a prescribed region. If the fly height is too great, the signals transmitted and read by the head will be too weak for accurate data storage and retrieval. If the fly height is too small, the head can physically contact the medium, causing physical damage to the medium and loss of the data stored on the medium.

Methods for detecting fly height generally employ a known pattern written on the storage medium. In response to the pattern, the head produces one or more pulses. One conventional method to detect fly height measures the peak amplitude of the pulse. Another conventional method is to measure the duration of the pulse, for example at its half-amplitude point. Still another method involves measuring the area under the pulse. These method are unreliable because the amplitude of the pulse, and the area under the pulse, are affected unpredictably by factors such as the gain of the storage system.

SUMMARY OF THE INVENTION

In general, in one aspect, the invention features a data storage system comprising a storage medium; a head; a pulse circuit adapted to generate a pulse in response to a transition of the head over a predetermined pattern on the storage medium; a measurement circuit adapted to determine a first amplitude of the pulse at a first predetermined time and one or more second amplitudes of the pulse at respective second predetermined times; a calculation circuit adapted to provide a signal representing a distance between the head and the storage medium based on a function of the first and second amplitudes; and a head controller adapted to control the distance between the head and the storage medium based on the signal provided by the calculation circuit.

Particular implementations can include one or more of the following features. The function of the first and second amplitudes is a ratio of the first and second amplitudes. The function of the first and second amplitudes is a ratio of the first amplitude to a sum of the second amplitudes. The function of the first and second amplitudes is a logarithm of a ratio of the first amplitude to a sum of the second amplitudes. A plurality of symbols of data are stored on the storage medium; the measurement circuit takes samples of the pulse at a baud rate of the symbols of the data; the first amplitude is determined from the one of the samples nearest a maximum amplitude of the pulse; and the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium; the measurement circuit takes samples of the pulse at a baud rate of the symbols of the data; the first amplitude is determined from the one of the samples nearest a maximum amplitude of the pulse; and the second amplitudes comprise an immediately previous amplitude determined from the one of the samples immediately preceding the one of the samples nearest the maximum amplitude of the pulse, and an immediately succeeding amplitude determined from the one of the samples immediately succeeding the one of the samples nearest the maximum amplitude of the pulse. A plurality of symbols of data are stored on the storage medium; the measurement circuit takes samples of the pulse at n times the baud rate of the symbols of the data, where n>1; the first amplitude is determined from the one of the samples nearest a maximum amplitude of the pulse; and the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium; wherein the measurement circuit takes samples of the pulse at n times the baud rate of the symbols of the data, where n>1; wherein the first amplitude is determined from the one of the samples nearest a maximum amplitude of the pulse; and wherein the second amplitudes comprise a previous amplitude determined from the one of the samples immediately preceding the n−1 of the samples immediately preceding the one of the samples nearest the maximum amplitude of the pulse, and a succeeding amplitude determined from the one of the samples immediately succeeding the n−1 of the samples immediately succeeding the one of the samples nearest the maximum amplitude of the pulse.

In general, in one aspect, the invention features an apparatus for determining a distance between a head and a storage medium, the apparatus comprising a pulse circuit adapted to generate a pulse in response to a transition of the head over a predetermined pattern on the storage medium; a measurement circuit adapted to determine a first amplitude of the pulse at a first predetermined time and one or more second amplitudes of the pulse at respective second predetermined times; and a calculation circuit adapted to provide a signal representing the distance between the head and the storage medium based on a function of the first and second amplitudes.

Particular implementations can include one or more of the following features. The function of the first and second amplitudes is a ratio of the first and second amplitudes. The function of the first and second amplitudes is a ratio of the first amplitude to a sum of the second amplitudes. The function of the first and second amplitudes is a logarithm of a ratio of the first amplitude to a sum of the second amplitudes. A plurality of symbols of data are stored on the storage medium; the measurement circuit takes samples of the pulse at a baud rate of the symbols of the data; the first amplitude is determined from the one of the samples nearest a maximum amplitude of the pulse; and the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium; the measurement circuit takes samples of the pulse at a baud rate of the symbols of the data; the first amplitude is determined from the one of the samples nearest a maximum amplitude of the pulse; and the second amplitudes comprise an immediately previous amplitude determined from the one of the samples immediately preceding the one of the samples nearest the maximum amplitude of the pulse, and an immediately succeeding amplitude determined from the one of the samples immediately succeeding the one of the samples nearest the maximum amplitude of the pulse. A plurality of symbols of data are stored on the storage medium; the measurement circuit takes samples of the pulse at n times the baud rate of the symbols of the data, where n>1; the first amplitude is determined from the one of the samples nearest a maximum amplitude of the pulse; and the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium; the measurement circuit takes samples of the pulse at n times the baud rate of the symbols of the data, where n>1; the first amplitude is determined from the one of the samples nearest a maximum amplitude of the pulse; and the second amplitudes comprise a previous amplitude determined from the one of the samples immediately preceding the n−1 of the samples immediately preceding the one of the samples nearest the maximum amplitude of the pulse, and a succeeding amplitude determined from the one of the samples immediately succeeding the n−1 of the samples immediately succeeding the one of the samples nearest the maximum amplitude of the pulse.

In general, in one aspect, the invention features an integrated circuit for determining a distance between a head and a storage medium, the integrated circuit comprising a measurement circuit adapted to receive a pulse from the head in response to a transition of the head over a predetermined pattern on the storage medium, and adapted to determine a first amplitude of the pulse at a first predetermined time and one or more second amplitudes of the pulse at respective second predetermined times; and a calculation circuit adapted to provide a signal representing the distance between the head and the storage medium based on a function of the first and second amplitudes.

Particular implementations can include one or more of the following features. The function of the first and second amplitudes is a ratio of the first and second amplitudes. The function of the first and second amplitudes is a ratio of the first amplitude to a sum of the second amplitudes. The function of the first and second amplitudes is a logarithm of a ratio of the first amplitude to a sum of the second amplitudes. A plurality of symbols of data are stored on the storage medium; the measurement circuit takes samples of the pulse at a baud rate of the symbols of the data; the first amplitude is determined from the one of the samples nearest a maximum amplitude of the pulse; and the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium; the measurement circuit takes samples of the pulse at a baud rate of the symbols of the data; the first amplitude is determined from the one of the samples nearest a maximum amplitude of the pulse; and the second amplitudes comprise an immediately previous amplitude determined from the one of the samples immediately preceding the one of the samples nearest the maximum amplitude of the pulse, and an immediately succeeding amplitude determined from the one of the samples immediately succeeding the one of the samples nearest the maximum amplitude of the pulse. A plurality of symbols of data are stored on the storage medium; the measurement circuit takes samples of the pulse at n times the baud rate of the symbols of the data, where n>1; the first amplitude is determined from the one of the samples nearest a maximum amplitude of the pulse; and the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium; the measurement circuit takes samples of the pulse at n times the baud rate of the symbols of the data, where n>1; the first amplitude is determined from the one of the samples nearest a maximum amplitude of the pulse; and the second amplitudes comprise a previous amplitude determined from the one of the samples immediately preceding the n−1 of the samples immediately preceding the one of the samples nearest the maximum amplitude of the pulse, and a succeeding amplitude determined from the one of the samples immediately succeeding the n−1 of the samples immediately succeeding the one of the samples nearest the maximum amplitude of the pulse.

In general, in one aspect, the invention features a method, apparatus, and computer-readable media comprising receiving a pulse generated in response to a transition of a head over a predetermined pattern on a storage medium; measuring a first amplitude of the pulse at a first predetermined time and one or more second amplitudes of the pulse at respective second predetermined times; and calculating a distance between the head and the storage medium based on a function of the first and second amplitudes.

Particular implementations can include one or more of the following features. The function of the first and second amplitudes is a ratio of the first and second amplitudes. The function of the first and second amplitudes is a ratio of the first amplitude to a sum of the second amplitudes. The function of the first and second amplitudes is a logarithm of a ratio of the first amplitude to a sum of the second amplitudes. A plurality of symbols of data are stored on the storage medium, further comprising taking samples of the pulse at a baud rate of the symbols of the data; wherein the first amplitude is determined from the one of the samples nearest a maximum amplitude of the pulse; and wherein the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium, further comprising taking samples of the pulse at a baud rate of the symbols of the data; wherein the first amplitude is determined from the one of the samples nearest a maximum amplitude of the pulse; and wherein the second amplitudes comprise an immediately previous amplitude determined from the one of the samples immediately preceding the one of the samples nearest the maximum amplitude of the pulse, and an immediately succeeding amplitude determined from the one of the samples immediately succeeding the one of the samples nearest the maximum amplitude of the pulse. A plurality of symbols of data are stored on the storage medium, further comprising taking samples of the pulse at n times the baud rate of the symbols of the data, where n>1; wherein the first amplitude is determined from the one of the samples nearest a maximum amplitude of the pulse; and wherein the second amplitudes comprise a previous amplitude determined from the one of the samples preceding the one of the samples nearest the maximum amplitude of the pulse, and a succeeding amplitude determined from the one of the samples succeeding the one of the samples nearest the maximum amplitude of the pulse. A plurality of symbols of data are stored on the storage medium, further comprising wherein the measurement circuit takes samples of the pulse at n times the baud rate of the symbols of the data, where n>1; wherein the first amplitude is determined from the one of the samples nearest a maximum amplitude of the pulse; and wherein the second amplitudes comprise a previous amplitude determined from the one of the samples immediately preceding the n−1 of the samples immediately preceding the one of the samples nearest the maximum amplitude of the pulse, and a succeeding amplitude determined from the one of the samples immediately succeeding the n−1 of the samples immediately succeeding the one of the samples nearest the maximum amplitude of the pulse. Implementations comprise controlling the distance between the head and the storage medium based on the calculated distance between the head and the storage medium. Implementations comprise generating the pulse in response to a transition of a head over a predetermined pattern on a storage medium.

In general, in one aspect, the invention features a data storage system comprising a storage medium; a head; a pulse circuit adapted to generate a pulse in response to a transition of the head over a predetermined pattern on the storage medium; a measurement circuit adapted to determine a first amplitude of a power spectrum of the pulse at a first predetermined frequency and a second amplitude of the power spectrum of the pulse at respective second predetermined frequencies; and a calculation circuit adapted to provide a signal representing a distance between the head and the storage medium based on a function of the first and second amplitudes; and a head controller adapted to control the distance between the head and the storage medium based on the signal provided by the calculation circuit.

Particular implementations can include one or more of the following features. The function of the first and second amplitudes is a ratio of the first and second amplitudes. The function of the first and second amplitudes is a logarithm of a ratio of the first and second amplitudes. A sequence of symbols of data having first and third harmonics is stored on the storage medium; the first amplitude is determined at the first harmonic of the power spectrum of the pulse; and the second amplitude is determined at the third harmonic of the power spectrum of the pulse.

In general, in one aspect, the invention features an apparatus for controlling a head in a data storage system comprising a storage medium, the apparatus comprising a pulse circuit adapted to generate a pulse in response to a transition of the head over a predetermined pattern on the storage medium; a measurement circuit adapted to determine a first amplitude of a power spectrum of the pulse at a first predetermined frequency and a second amplitude of the power spectrum of the pulse at respective second predetermined frequencies; and a calculation circuit adapted to provide a signal representing a distance between the head and the storage medium based on a function of the first and second amplitudes.

Particular implementations can include one or more of the following features. The function of the first and second amplitudes is a ratio of the first and second amplitudes. The function of the first and second amplitudes is a logarithm of a ratio of the first and second amplitudes. A sequence of symbols of data having first and third harmonics is stored on the storage medium; the first amplitude is determined at the first harmonic of the power spectrum of the pulse; and the second amplitude is determined at the third harmonic of the power spectrum of the pulse.

In general, in one aspect, the invention features an integrated circuit for controlling a head in a data storage system comprising a storage medium, the integrated circuit comprising a measurement circuit adapted to receive a pulse in response to a transition of the head over a predetermined pattern on the storage medium, and adapted to determine a first amplitude of a power spectrum of the pulse at a first predetermined frequency and a second amplitude of the power spectrum of the pulse at respective second predetermined frequencies; and a calculation circuit adapted to provide a signal representing a distance between the head and the storage medium based on a function of the first and second amplitudes.

Particular implementations can include one or more of the following features. The function of the first and second amplitudes is a ratio of the first and second amplitudes. The function of the first and second amplitudes is a logarithm of a ratio of the first and second amplitudes. A sequence of symbols of data having first and third harmonics is stored on the storage medium; wherein the first amplitude is determined at the first harmonic of the power spectrum of the pulse; and wherein the second amplitude is determined at the third harmonic of the power spectrum of the pulse.

In general, in one aspect, the invention features a method, apparatus, and computer-readable media comprising receiving a pulse generated in response to a transition of a head over a predetermined pattern on a storage medium; measuring a first amplitude of a power spectrum of the pulse at a first predetermined frequency and a second amplitude of the power spectrum of the pulse at respective second predetermined frequencies; and calculating a distance between the head and the storage medium based on a function of the first and second amplitudes.

Particular implementations can include one or more of the following features. The function of the first and second amplitudes is a ratio of the first and second amplitudes. The function of the first and second amplitudes is a logarithm of a ratio of the first and second amplitudes. A sequence of symbols of data having first and third harmonics is stored on the storage medium; wherein the first amplitude is determined at the first harmonic of the power spectrum of the pulse; and wherein the second amplitude is determined at the third harmonic of the power spectrum of the pulse. Implementations comprise controlling a distance between the head and the storage medium based on the distance between the head and the storage medium determined by the calculation circuit and generating the pulse in response to a transition of a head over a predetermined pattern on a storage medium.

The details of one or more implementations are set forth in the accompanying drawings and the description below. Other features will be apparent from the description and drawings, and from the claims.

Figure 1:
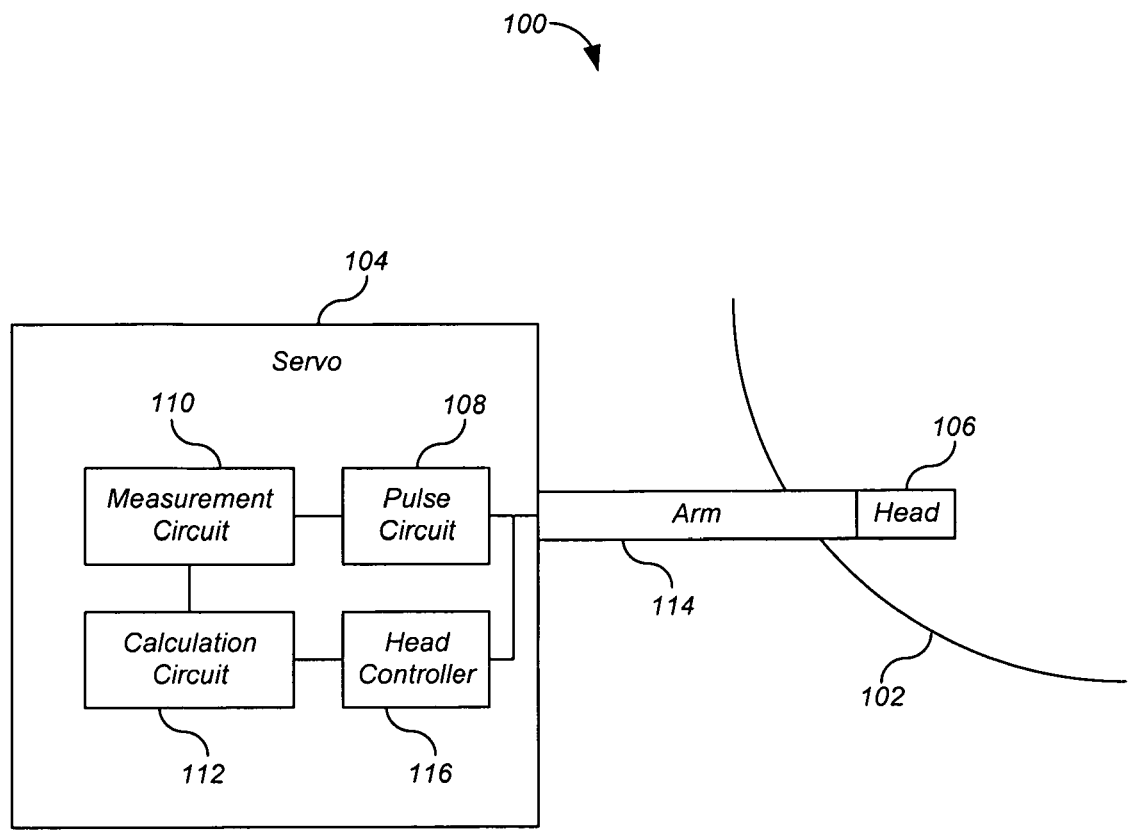
FIG. 1 shows a data storage system comprising a data storage medium and a servo according to a preferred embodiment.

The leading digit(s) of each reference numeral used in this specification indicates the number of the drawing in which the reference numeral first appears.

DETAILED DESCRIPTION

Embodiments of the present invention detect fly height by determining channel bit density (CBD), which is given by $$CBD = PW_{50}/T \quad (1)$$

where T is the symbol duration and $PW_{50}$ is the duration of the pulse at its half-amplitude point, which for an inductive head is approximated by $$PW_{50} \approx \sqrt{g^2 + 4(d+a)^2} \quad (2a)$$

and which for a magneto-resistive head is approximated by $$PW_{50} \approx \sqrt{2g^2 + 4(d+a)^2} \quad (2b)$$

where g is the gap of the head, a is the transition length, and d is the fly height. Once CBD is known, equations (1) and (2) can be used to determine the fly height d.

When the head encounters a transition on the disk, the head generates a signal s(t) that can be modeled as a Lorentzian pulse $$s(t) = \frac{1}{1 + \left(\frac{2t}{PW_{50}}\right)^2} \quad (3)$$

where t is the time variable. This signal can be written as $$y(t) = \sum_m (u_m - u_{m-1}) s(t - mT) + n(t) \quad (4)$$

where $u_m$ is the data stream written onto the disk, spaced by time T, and where n(t) is the noise in the signal. After sampling, the discrete-time signal can be written as $$y_k = y(kT) = \sum_m (u_m - u_{m-1}) s(kT - mT) + n(kT) \quad (5)$$

Clearly, with the same input data, $y_k$ depends on s(t), which is a function of fly height d.

FIG. 1 shows a data storage system 100 comprising a data storage medium 102 and a servo 104 according to a preferred embodiment. For example, data storage medium 102 can be a magnetic hard disc and servo 104 can be a hard disc servo. However, storage medium 102 can also be an optical disc or other type of storage media. Servo 104 is connected by an arm 114 to a head 106 for transferring data to and/or from storage medium 102. Servo 104 comprises a pulse circuit 108, a measurement circuit 110, a calculation circuit 112, and a head controller 116.

Figure 2:
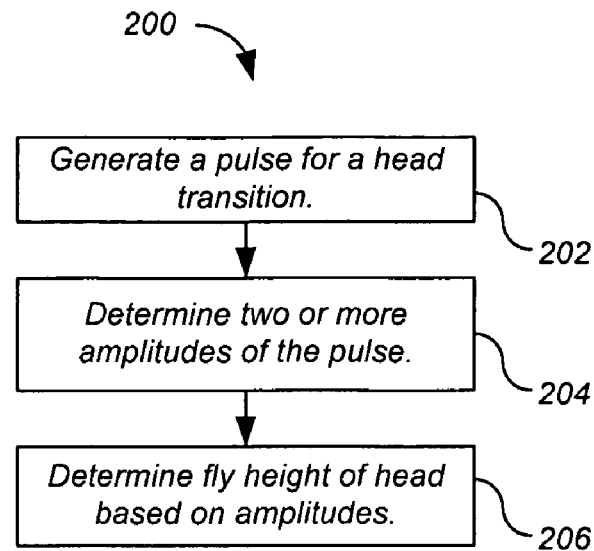
FIG. 2 shows a process that can be implemented by the data storage system of FIG. 1 to detect fly height in the time domain according to a preferred embodiment.

According to one embodiment, the fly height is detected in the time domain by determining a function of two or more samples of the pulse. FIG. 2 shows a process 200 that can be implemented by data storage system 100 to detect fly height in the time domain according to a preferred embodiment. Pulse circuit 108 generates a pulse in response to each transition of the head over a predetermined pattern on the storage medium (step 202). Such a pulse 302 is shown in FIG. 3.

Measurement circuit 110 determines two or more amplitudes of the pulse at respective different times (step 204). Calculation circuit 112 determines a distance between the head and the storage medium based on a function of the amplitudes (step 206).

Figure 3:
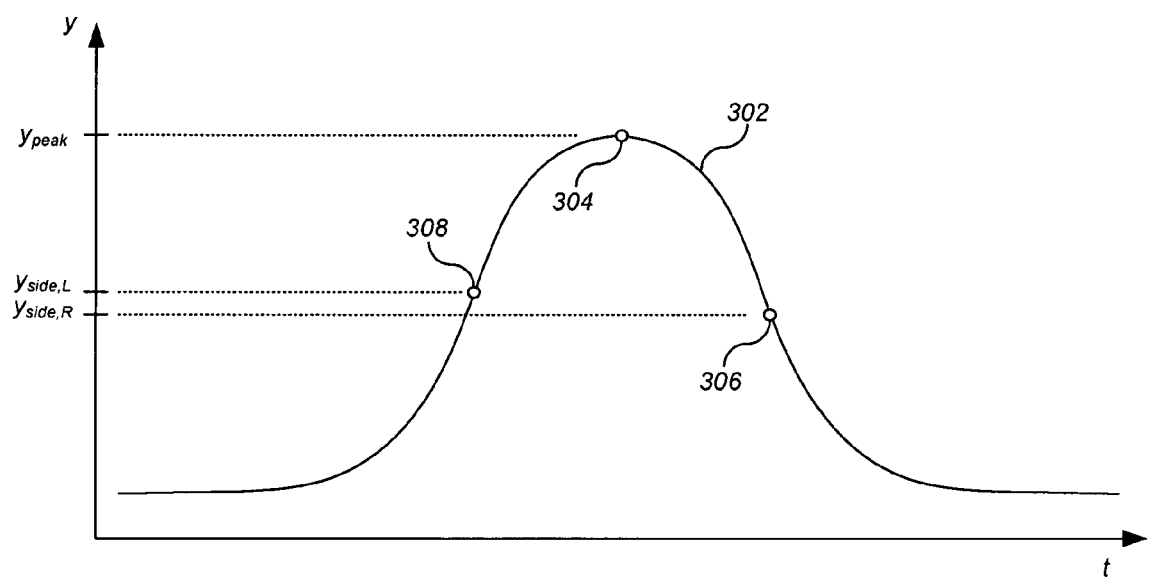
FIG. 3 shows a pulse generated in response to the transition of a head over a predetermined pattern on a storage medium.

Referring to FIG. 3, measurement circuit 110 preferably determines an amplitude $y_{peak}$ of the peak of pulse 302, and amplitudes $y_{side,L}$ and $y_{side,R}$ on the left and right sides, respectively, of pulse 302. Calculation circuit 112 computes a peak-to-side ratio $r_{ps}$, preferably over many pulses 302, according to $$r_{ps} = -\log\left(\log\left(\frac{A \sum |y_{peak}|}{\sum |y_{side,L}| + \sum |y_{side,R}|}\right)\right) \quad (6)$$

where A is a constant. For example, for a 12T pattern (six ones followed by six zeroes), A=2. Of course, other patterns, and other functions of these amplitudes can be used to compute peak-to-side ratio $r_{ps}$. In other embodiments, peak-to-side ratio $r_{ps}$ is computed simply as the ratio of equation (6) without the logarithm function.

Alternatively, measurement circuit determines amplitude $y_{peak}$ of the peak of pulse 302, and an amplitude $y_{side}$ of one of the sides of pulse 302. Calculation circuit 112 computes peak-to-side ratio $r_{ps}$, preferably over many pulses 302, according to $$r_{ps} = -\log\left(\log\left(\frac{B \sum |y_{peak}|}{\sum |y_{side}|}\right)\right) \quad (7)$$

where B is a constant. For example, for a 6T pattern (six ones followed by six zeroes), B=1, and for a 12T pattern (12 ones followed by 12 zeroes), B=2. Of course, other patterns, and other functions of these amplitudes can be used to compute peak-to-side ratio $r_{ps}$. In other embodiments, peak-to-side ratio $r_{ps}$ is computed simply as the ratio of equation (7) without the logarithm function. In any such embodiment, the peak-to-side ratio $r_{ps}$ is preferably determined for multiple pulses, and the results are combined, for example by averaging or weighted averaging.

In a preferred embodiment, measurement circuit 110 takes samples of the pulse at a baud rate of the symbols of the data read from data storage medium 102, and determines two or more amplitudes of the pulse using the samples. Referring again to FIG. 3, amplitude $y_{peak}$ is determined from the sample 304 nearest the peak of pulse 302, and amplitudes $y_{side,L}$ and $y_{side,R}$ are determined from samples preceding (306) and succeeding (308) that sample, respectively. Samples 306 and 308 can immediately precede and succeed sample 304, or can be separated from sample 304 by one or more other samples.

Figure 4:
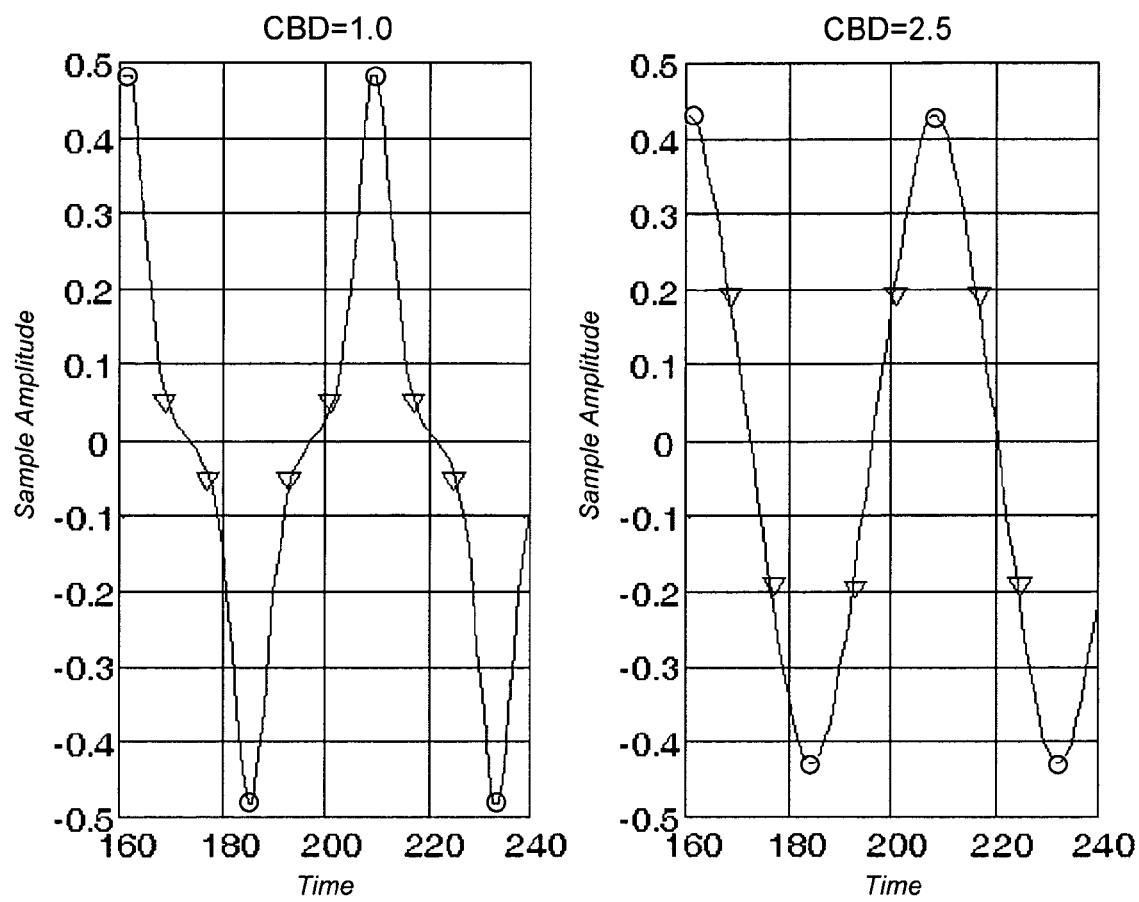
FIG. 4 shows how the peak-to-side ratio of a pulse varies with channel bit density (CBD).

Head controller 116 controls the distance between the head and the storage medium based on the peak-to side ratio $r_{ps}$. The peak-to-side ratio is a good measurement of CBD because it is independent of factors such as the gain of the storage system. FIG. 4 shows how the ratio varies with CBD. Referring to FIG. 4, graph 402 shows four peak samples (represented by circles) and six side samples (represented by triangles) for a pulse having CBD=1.0. Graph 404 shows four peak samples (represented by circles) and six side samples (represented by triangles) for a pulse having CBD=2.5. Because pulse width narrows with reduced CBD, the peak-to-side ratio increases, as is evident from FIG. 4.

Figure 5:
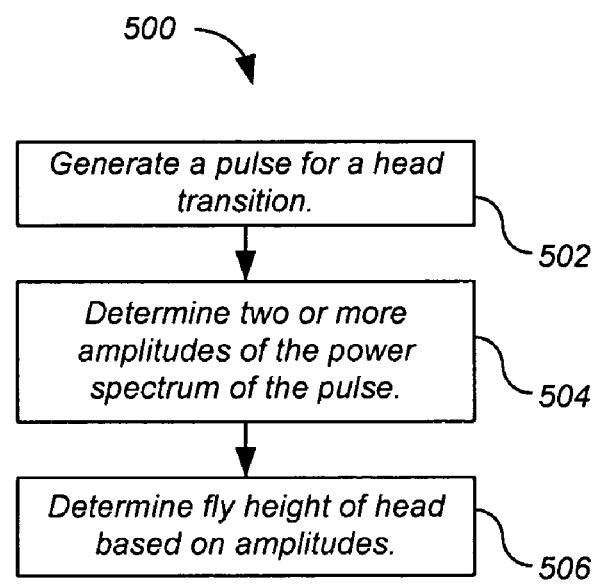
FIG. 5 shows a process that can be implemented by data storage system to detect fly height in the frequency domain according to a preferred embodiment.
Figure 6:
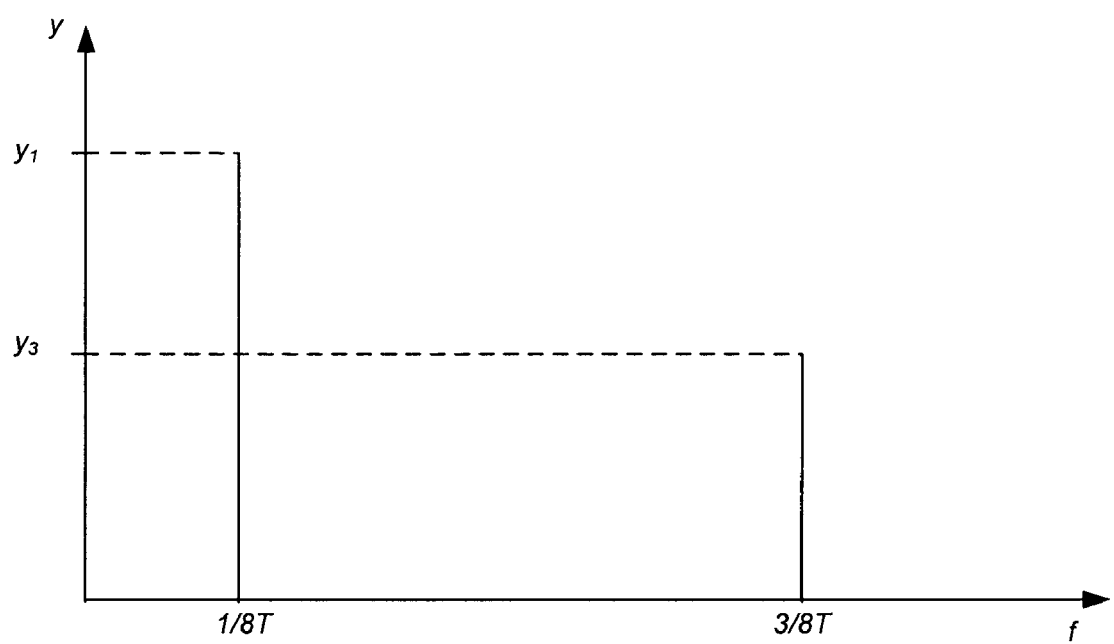
FIG. 6 shows the power spectrum of a pulse generated in response to the transition of a head over a predetermined pattern on a storage medium.

According to one embodiment, the fly height is detected in the frequency domain by determining a function of two or more samples of the power spectrum of the pulse. FIG. 5 shows a process 500 that can be implemented by data storage system 100 to detect fly height in the frequency domain according to a preferred embodiment. Pulse circuit 108 generates a pulse in response to each transition of the head over a predetermined pattern on the storage medium (step 502). Such a pulse has a power spectrum 602 as shown in FIG. 6.

Measurement circuit 110 determines two or more amplitudes of the power spectrum at respective different frequencies (step 504). Calculation circuit 112 determines a distance between the head and the storage medium based on a function of the amplitudes (step 506).

Preferably measurement circuit 110 makes this measurement as the head passes over a known sequence or pattern of symbols stored on the storage medium. Preferably the pattern produces a harmonic at a high frequency and a harmonic at a low frequency so the ratio between the amplitudes of power spectrum 602 at those harmonics is large, For example, a pattern having first and third harmonics is preferable. Such a pattern is the 8T pattern (four ones followed by four zeroes), where the harmonics occur at ⅛T and ⅜T, where T is the symbol duration.

Measurement circuit 110 preferably measures the amplitudes of power spectrum 602 at the first and third harmonic frequencies, respectively. Referring to FIG. 6, measurement circuit 110 preferably measures an amplitude y1 of the first harmonic of power spectrum 602 and measures an amplitude y3 of the third harmonic of power spectrum 602. Calculation circuit 112 computes a ratio $r_{fft}$ of the amplitudes, preferably over many pulses 302, according to $$r_{fft} = \log\left(\frac{\left\|\sum_k y_k e^{-jk\frac{\pi}{4}}\right\|^2}{\left\|\sum_k y_k e^{-jk\frac{3\pi}{4}}\right\|^2}\right) \quad (8)$$

Of course, other functions of these amplitudes can be used to compute ratio $r_{fft}$. In other embodiments, ratio $r_{fft}$ is computed simply as the ratio of equation (8) without the logarithm function. In any such embodiment, the ratio $r_{fft}$ is preferably determined for multiple pulses, and the results are combined, for example by averaging or weighted averaging.

This operation can be implemented as a fast Fourier transform (FFT) using two filters for each frequency component (one for the sine component, and the other one for the cosine component) according to $$\sum_k y_k e^{-jk\frac{\pi}{4}} = \sum_k y_k \cos\left(-k\frac{\pi}{4}\right) + j\sum_k y_k \sin\left(-k\frac{\pi}{4}\right) \quad (9)$$

The full FFT operation can be simplified to compute only the cosine (or the sine) component according to $$r_{fft,real} = \frac{1}{2}\log\left(\frac{\left\|\sum_k y_k \cos\left(-k\frac{\pi}{4}\right)\right\|^2}{\left\|\sum_k y_k \cos\left(-k\frac{3\pi}{4}\right)\right\|^2}\right) \quad (10)$$

Different input patterns produce different power spectra 602. Therefore any other pattern having a power spectrum that changes with CBD can be used.

Figure 7:
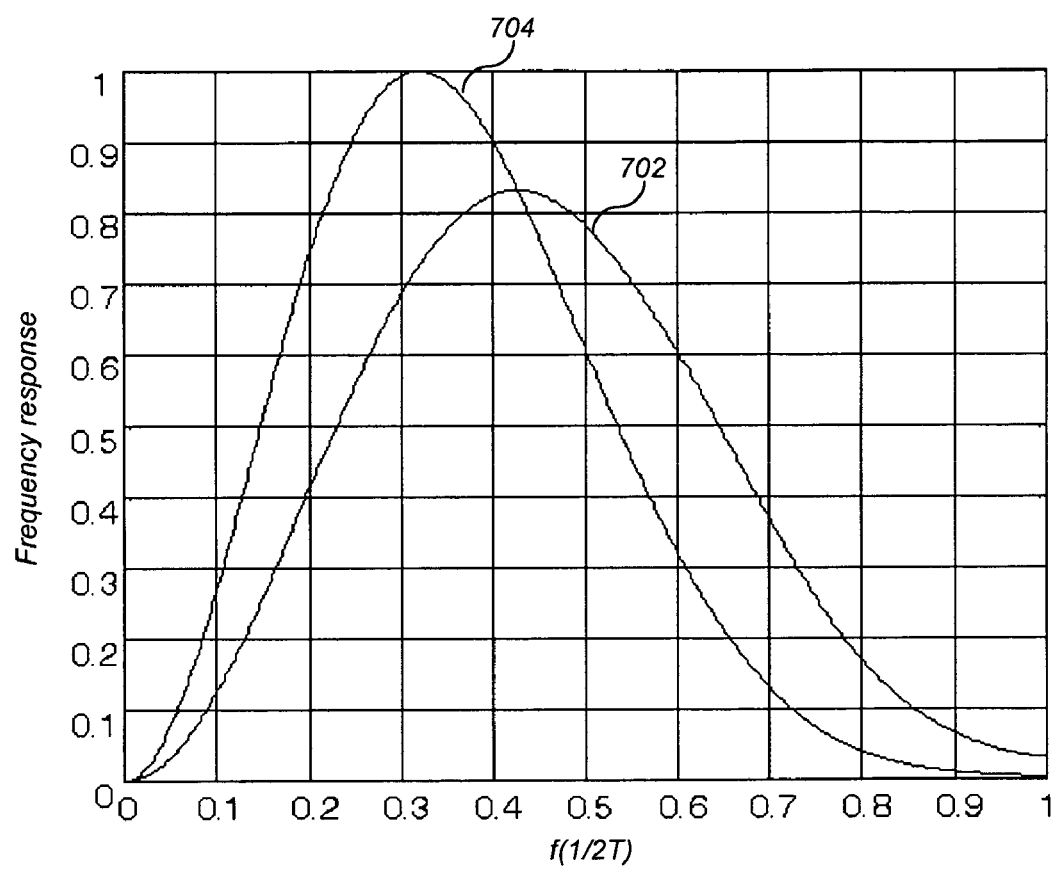
FIG. 7 shows two power spectra and for a single pulse.

Head controller 116 controls the distance between the head and the storage medium based on the ratio $r_{fft}$. The ratio $r_{fft}$ is a good measurement of CBD because it is independent of factors such as the gain of the storage system. FIG. 7 shows two power spectra 702 and 704 for a single pulse 302. Power spectrum 702 is for a pulse 302 having CBD=1.0. Power spectrum 704 is for a pulse 302 having CBD=2.5. From FIG. 7 it is clear that the ratio of the amplitudes of the first and third harmonics of a symbol pattern changes substantially with CBD.

Figure 8:
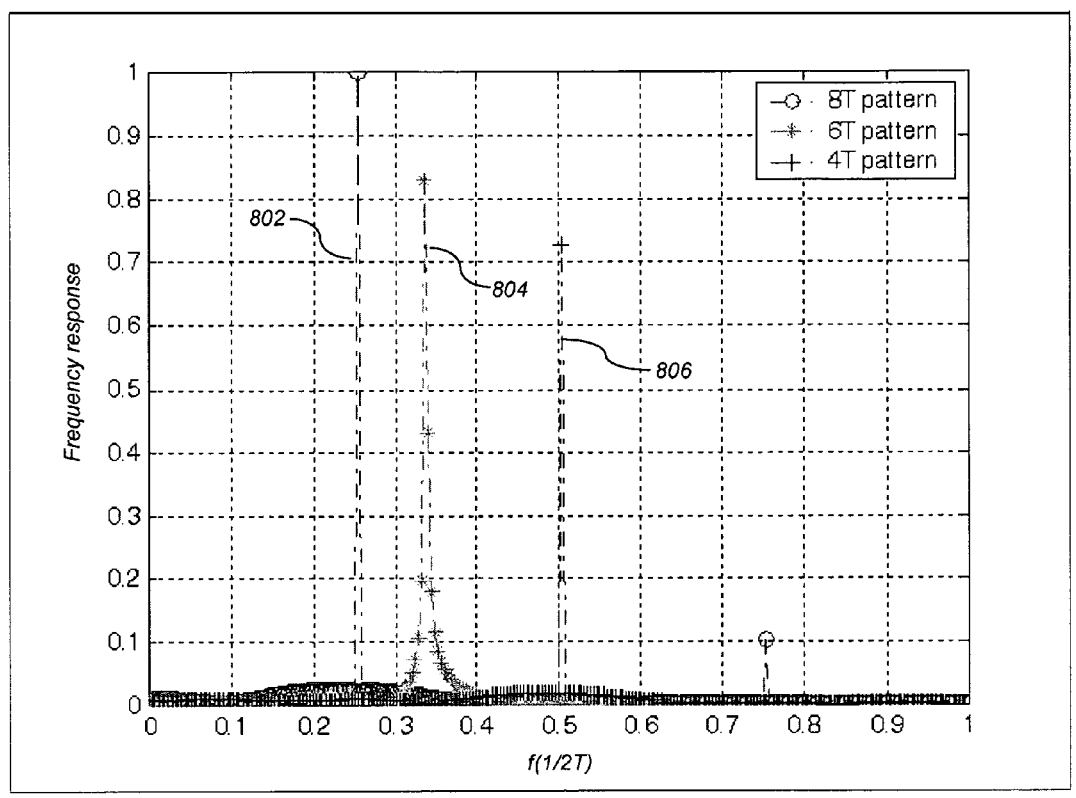
FIG. 8 shows the power spectra for different input data patterns.

FIG. 8 shows the power spectra for different input data patterns. Spectrum 802 is for an 8T pattern. Spectrum 804 is for a 6T pattern. Spectrum 806 is for a 4T pattern. From FIG. 8 it is clear that the 8T pattern has well-separated first and third harmonics, and so is well-suited for use with the present invention.

However, the 4T pattern is already present on many storage media, for example as the preamble for hard disk drives. In one embodiment well-suited for use with 4T patterns, measurement circuit 110 takes samples of the pulse at twice the baud rate of the symbols of the data read from data storage medium 102. This oversampling produces a power spectrum for the 4T pattern that resembles the power spectrum of the 8T pattern, with well-separated first and third harmonics. Of course, other oversampling multiples can be used with the 4T patterns and other patterns. For two-time oversampling, equations (5), (8) and (10) are replaced by equations (11), (12), and (13), respectively, given below.

$$y'_k = y\left(k\frac{T}{2}\right) = \sum_m (u_m - u_{m-1})s\left(k\frac{T}{2} - mT\right) + n(kT) \quad (11)$$

$$r'_{fft} = \log\left(\frac{\left\|\sum_k y'_k e^{-jk\frac{\pi}{4}}\right\|^2}{\left\|\sum_k y'_k e^{-jk\frac{3\pi}{4}}\right\|^2}\right) \quad (12)$$

-continued $$r'_{fft,real} = \frac{1}{2}\log\left(\frac{\left\|\sum_k y'_k \cos\left(-k\frac{\pi}{4}\right)\right\|^2}{\left\|\sum_k y'_k \cos\left(-k\frac{3\pi}{4}\right)\right\|^2}\right) \quad (13)$$

Figure 9:
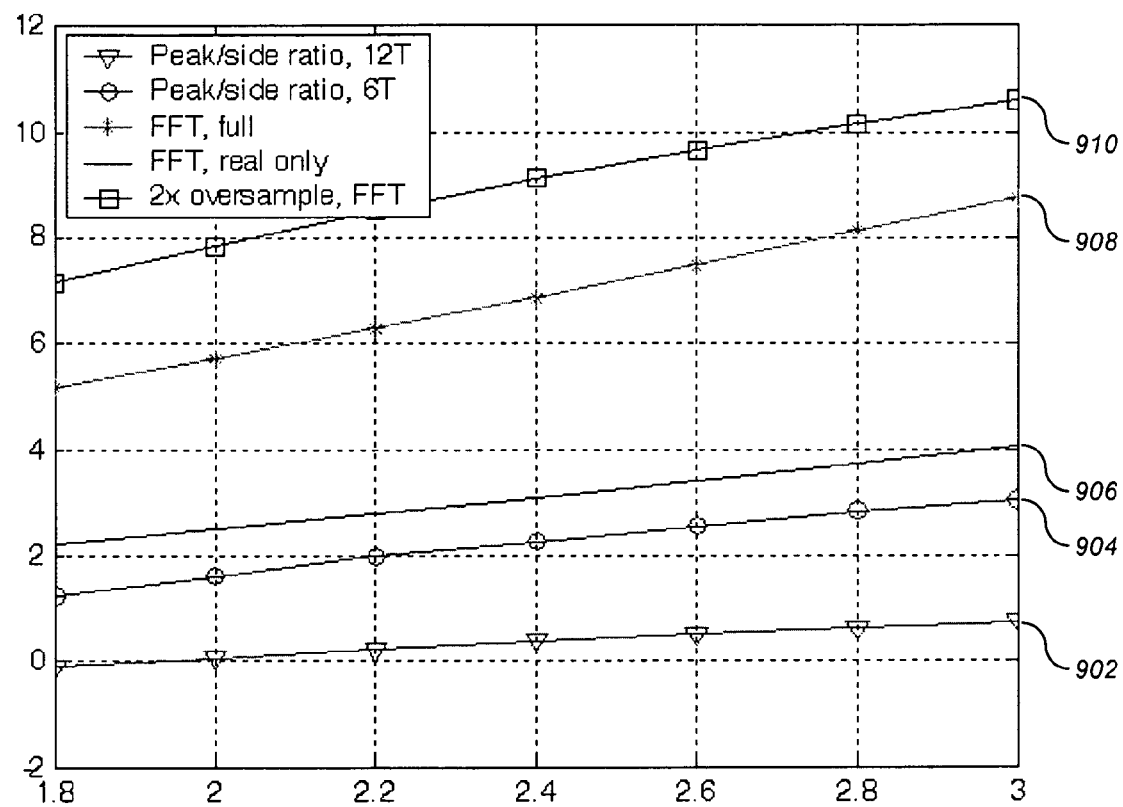
FIG. 9 shows a comparison of some embodiments of the present invention by presenting the computed ratio as a function of CBD.

FIG. 9 shows a comparison of some embodiments of the present invention by presenting the computed ratio as a function of CBD. Curve 902, with data points shown as triangles, is for a peak-to-side ratio of a 12T pattern. Curve 904, with data points shown as circles, is for a peak-to-side ratio of a 6T pattern. Curve 906, with data points not shown, is for a power spectrum ratio $r_{fft,Real}$. Curve 908, with data points shown as asterisks, is for a power spectrum ratio $r_{fft}$. Curve 910, with data points shown as squares, is for a power spectrum ratio $r_{fft}$ for 2× oversampling.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed:

1. A fly height control system comprising:
    a measurement circuit that receives M pulses that are based on a predetermined pattern stored on a storage medium and that determines a first amplitude and a second amplitude for each of the M pulses, where M is an integer greater than one,
    wherein the first amplitude is determined at a first time and the second amplitude is determined at a second time that is different than the first time;
    a calculation circuit that determines a distance between a head and a storage medium based on a function of the first amplitudes for the M pulses and the second amplitudes for the M pulses; and
    a head controller that controls the head based on the distance determined by the calculation circuit.

2. The fly height control system of claim 1 wherein the measurement circuit determines a third amplitude for each of the M pulses and wherein the distance is further based on the third amplitudes for the M pulses.

3. The fly height control system of claim 1 wherein the function comprises a ratio of a product of a first constant and a sum of the first amplitudes for the M pulses to a sum of the second amplitudes for the M pulses.

4. The fly height control system of claim 3 wherein the function comprises a logarithm of the ratio.

5. The fly height control system of claim 2 wherein the function comprises a ratio of a product of a first constant and a sum of the first amplitudes for the M pulses to a sum of the second amplitudes for the M pulses and the third amplitudes for the M pulses.

6. The fly height control system of claim 5 wherein the function comprises a logarithm of the ratio.

7. The fly height control system of claim 1 wherein the first amplitudes correspond to a peak of each of the M pulses and wherein the second amplitudes correspond to one side of each of the M pulses.

8. The fly height control system of claim 2 wherein the first amplitudes correspond to a peak of each of the M pulses and wherein the second and third amplitudes correspond to opposite sides of each of the M pulses, respectively.

9. A method for controlling fly height, comprising:
    receiving M pulses that are based on a predetermined pattern stored on a storage medium;
    determining a first amplitude and a second amplitude for each of the M pulses, where M is an integer greater than one,
    wherein the first amplitude is determined at a first time and the second amplitude is determined at a second time that is different than the first time;
    determining a distance between a head and a storage medium based on a function of the first amplitudes for the M pulses and the second amplitudes for the M pulses; and
    controlling the head based on the distance.

10. The method of claim 9 further comprising:
    determining a third amplitude for each of the M pulses; and
    further basing the distance on the third amplitudes for the M pulses.

11. The method of claim 9 wherein the function comprises a ratio of a product of a first constant and a sum of the first amplitudes for the M pulses to a sum of the second amplitudes for the M pulses.

12. The method of claim 11 wherein the function comprises a logarithm of the ratio.

13. The fly height control system of claim 10 wherein the function comprises a ratio of a product of a first constant and a sum of the first amplitudes for the M pulses to a sum of the second amplitudes for the M pulses and the M third amplitudes for the M pulses.

14. The method of claim 13 wherein the function comprises a logarithm of the ratio.

15. The method of claim 9 wherein the first amplitudes correspond to a peak of each of the M pulses and wherein the second amplitudes correspond to one side of each of the M pulses.

16. The method of claim 10 wherein the first amplitudes correspond to a peak of each of the M pulses and wherein the second and third amplitudes correspond to opposite sides of each of the M pulses, respectively.

* * * * *

UNITED STATES PATENT AND TRADEMARK OFFICE
CERTIFICATE OF CORRECTION

PATENT NO.         : 7,518,820 B1
APPLICATION NO. : 12/082423
DATED              : April 14, 2009
INVENTOR(S)        : Zining Wu et al.

It is certified that error appears in the above-identified patent and that said Letters Patent is hereby corrected as shown below:

Column 1, Line 38    Delete "method" and insert -- methods --
Column 9, Line 42    Delete "," after "large" and insert -- . --

Signed and Sealed this

Ninth Day of June, 2009

JOHN DOLL
*Acting Director of the United States Patent and Trademark Office*